(12) United States Patent
Colonna et al.

(10) Patent No.: US 11,368,413 B2
(45) Date of Patent: Jun. 21, 2022

(54) INTER-SWITCH LINK IDENTIFICATION AND MONITORING

(71) Applicant: International Business Machines Corporation, Armonk, NY (US)

(72) Inventors: Christopher Colonna, Ossining, NY (US); Pasquale A. Catalano, Wallkill, NY (US); Stephen Robert Guendert, Poughkeepsie, NY (US); Michael James Becht, Poughkeepsie, NY (US); Patricia G. Driever, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 223 days.

(21) Appl. No.: 16/437,207

(22) Filed: Jun. 11, 2019

(65) Prior Publication Data

US 2020/0396182 A1 Dec. 17, 2020

(51) Int. Cl.
*H04L 49/90* (2022.01)
*H04L 45/12* (2022.01)
*G06F 13/16* (2006.01)
*H04L 45/00* (2022.01)
*H04L 45/02* (2022.01)

(52) U.S. Cl.
CPC .............. *H04L 49/90* (2013.01); *G06F 13/16* (2013.01); *H04L 45/10* (2013.01); *H04L 45/12* (2013.01); *H04L 45/54* (2013.01)

(58) Field of Classification Search
None
See application file for complete search history.

(56) References Cited

U.S. PATENT DOCUMENTS

| | | | |
|---|---|---|---|
| 7,243,160 B2 | 7/2007 | Brahmaroutu | |
| 7,430,164 B2 | 9/2008 | Bare | |
| 7,944,812 B2 | 5/2011 | Carlson et al. | |
| 9,473,408 B1 * | 10/2016 | Kabbani | H04L 47/122 |
| 9,667,476 B2 | 5/2017 | Benner et al. | |
| 9,727,501 B2 | 8/2017 | Gowravaram et al. | |
| 2005/0108444 A1 * | 5/2005 | Flauaus | H04L 47/11 |
| | | | 710/15 |
| 2008/0089336 A1 * | 4/2008 | Mercier | H04L 43/12 |
| | | | 370/392 |
| 2008/0244282 A1 * | 10/2008 | Hansalia | G06F 1/266 |
| | | | 713/300 |
| 2015/0071287 A1 * | 3/2015 | Berman | H04L 45/72 |
| | | | 370/392 |

(Continued)

*Primary Examiner* — Chi H Pham
*Assistant Examiner* — Raul Rivas
(74) *Attorney, Agent, or Firm* — Cantor Colburn LLP; Edward Wixted (57) ABSTRACT

Techniques for inter-switch link (ISL) identification and monitoring are described herein. An aspect includes sending a query fabric path command to a switch, the query fabric path command including an origin address and a destination address. Another aspect includes receiving a query fabric path response from the switch based on the query fabric path command, the query fabric path response including a plurality of port identifiers. Another aspect includes monitoring a plurality of ports, each of the plurality of ports corresponding to a respective port identifier of the plurality of port identifiers in the query fabric path response.

17 Claims, 5 Drawing Sheets

(56) References Cited

U.S. PATENT DOCUMENTS

2016/0197784 A1* 7/2016 Gandhi .............. H04L 41/0833
                                                    370/410
2018/0219755 A1    8/2018 Agarwal et al.

* cited by examiner

INTER-SWITCH LINK IDENTIFICATION AND MONITORING

BACKGROUND

The present invention generally relates to computer networks, and more specifically to inter-switch link (ISL) identification and monitoring in a computer network.

Fibre channel (FC) switches are used to connect servers to storage services and resources for creating a storage area network (SAN). In computing, a SAN may be a network designed to attach computer storage devices, such as disk array controllers and tape libraries, to servers. The SAN fabric is an active intelligent interconnection scheme that utilizes the Fibre Channel Architecture. Servers and storage devices connect to FC SAN switches as an N_Port (node port), while the switch provides an F_Port (fabric port). When two or more FC SAN switches are connected together to enlarge the switch fabric, they may utilize an E_Port (expansion port) on each end. E_Ports implement a mechanism to exchange configuration and topology information between the switches.

When the E_Ports of two switches support the same configuration and protocol parameters, the E_Ports may establish an inter-switch link (ISL) between the two switches. The industry standard for ISLs is defined in the T11 FC-SW-2 (and later versions) standard. ISLs established through E_Ports, as described above, have additional properties related to maintaining a consistent view of the fabric and the various devices among all the interconnected SAN switches. Any device with an E_Port connection to the SAN is a peer with all the switches, which are collectively managing and controlling the SAN itself. An alteration of an E_Port link may disrupt the SAN fabric management structure, and consequently may cause a momentary disruption across the entire SAN, while the interconnected switches re-establish the management hierarchy and restore the switch to switch communications. Accordingly, ISLs may expose the SAN to disruptions from events that would be trivial if occurring on a normal device link (e.g., an N_Port). For example, the routing tables may be changed in all switches within the fabric when any E_Port connection is altered.

SUMMARY

According to an embodiment described herein, a system can include a processor to send a query fabric path command to a switch, the query fabric path command including an origin address and a destination address. The processor can also receive a query fabric path response from the switch based on the query fabric path command, the query fabric path response including a plurality of port identifiers. The processor can also monitor a plurality of ports, each of the plurality of ports corresponding to a respective port identifier of the plurality of port identifiers in the query fabric path response.

According to another embodiment described herein, a method can include sending a query fabric path command to a switch, the query fabric path command including an origin address and a destination address. The method can also include receiving a query fabric path response from the switch based on the query fabric path command, the query fabric path response including a plurality of port identifiers. The method can also include monitoring a plurality of ports, each of the plurality of ports corresponding to a respective port identifier of the plurality of port identifiers in the query fabric path response.

According to another embodiment described herein, a computer program product can include a computer readable storage medium having program instructions embodied therewith, the program instructions executable by a processing device to cause the processing device to perform a method including sending a query fabric path command to a switch, the query fabric path command including an origin address and a destination address. The method can also include receiving a query fabric path response from the switch based on the query fabric path command, the query fabric path response including a plurality of port identifiers. The method can also include monitoring a plurality of ports, each of the plurality of ports corresponding to a respective port identifier of the plurality of port identifiers in the query fabric path response.

DETAILED DESCRIPTION

One or more embodiments of the present invention provide inter-switch link (ISL) identification and monitoring. Endpoints, including but not limited to servers or disks, that are connected by a storage area network (SAN) fabric may not be aware of the path (e.g., specific ISLs) taken through the SAN fabric between any two endpoints. Link failures on one or more ISLs of a fabric may cause connectivity failures at the endpoints. Read diagnostic parameters (RDP) requests may be issued by an endpoint to query a switch for information on any port of the SAN fabric. However, an endpoint may only have knowledge of the N-Port between the endpoint and a switch, and the N-Port between a destination endpoint and another switch. Any intermediate E-Ports may not be known. Embodiments of ISL identification and monitoring described herein allow an origin endpoint to query a switch for information regarding the path through the SAN fabric to a destination endpoint. With this knowledge, the origin endpoint may monitor the ports in the path(s) between the origin and destination endpoints by periodically requesting RDP information from the various ports. The RDP information allows the origin endpoint to identify any potentially failing ports, so that problems in any ISLs between the origin and destination endpoints may be identified and isolated before failure occurs.

Figure 1:
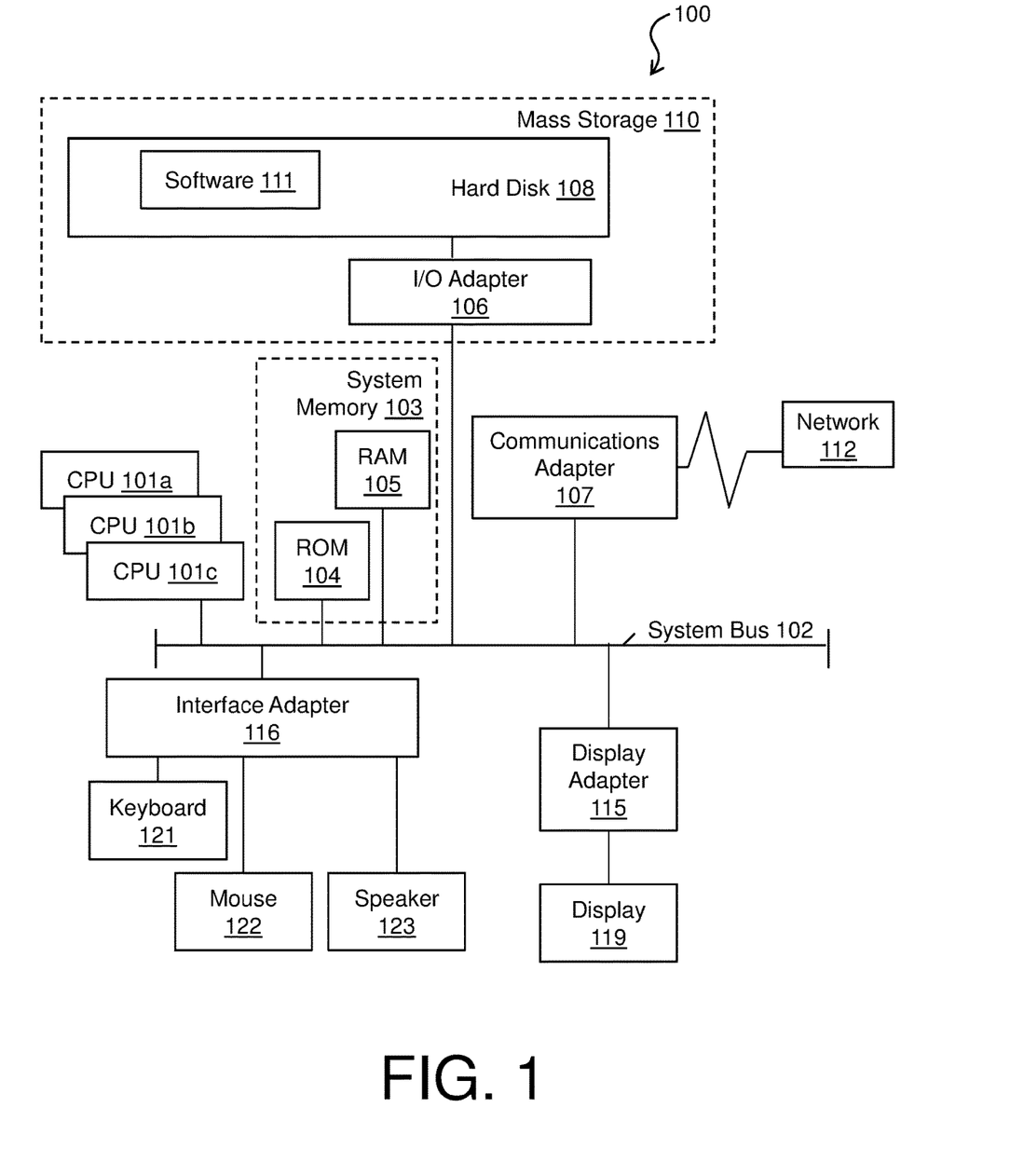
FIG. 1 is a block diagram of an example computer system for use in conjunction with one or more embodiments of inter-switch link (ISL) identification and monitoring.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units, i.e., CPUs 101a, 101b, 101c, etc. (collectively or generically referred to as processor 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2A:
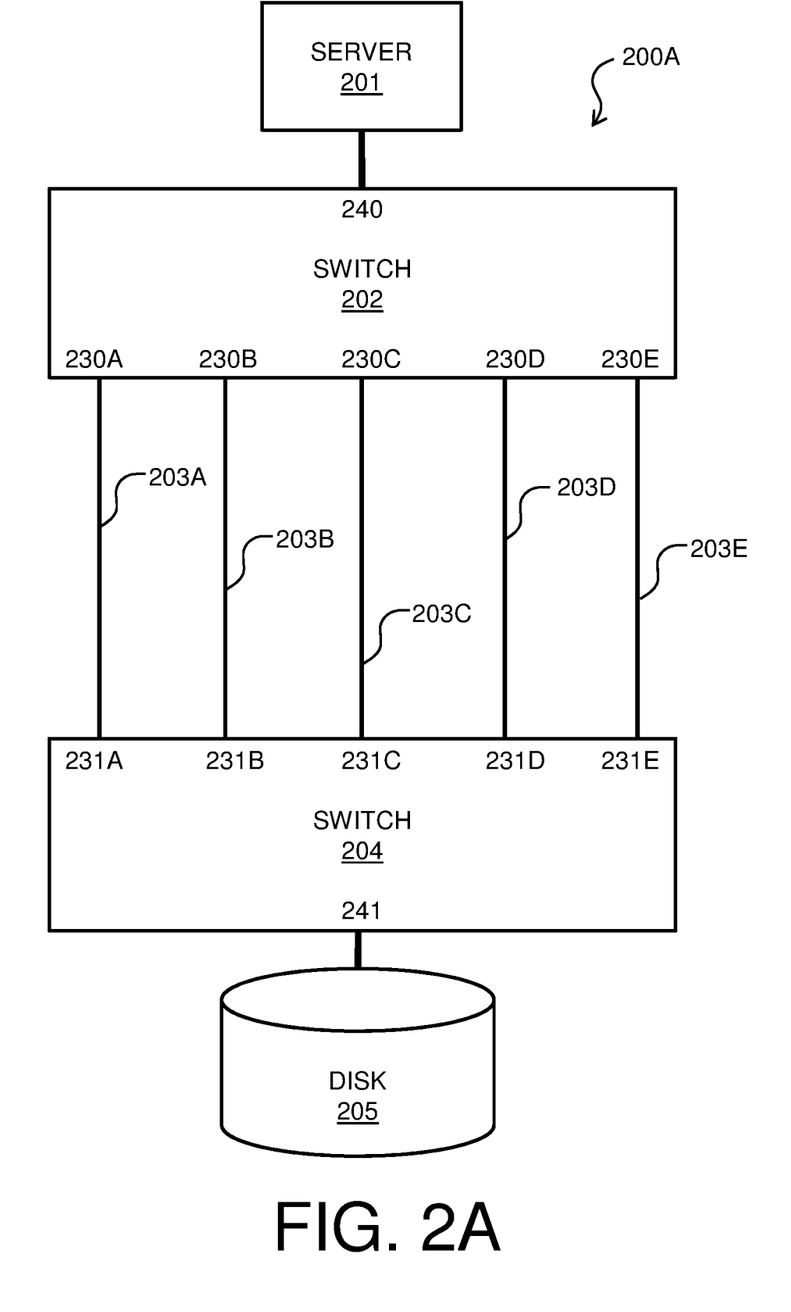
FIGS. 2A-C are a block diagrams of systems for ISL identification and monitoring in accordance with one or more embodiments of the present invention.
Figure 2B:
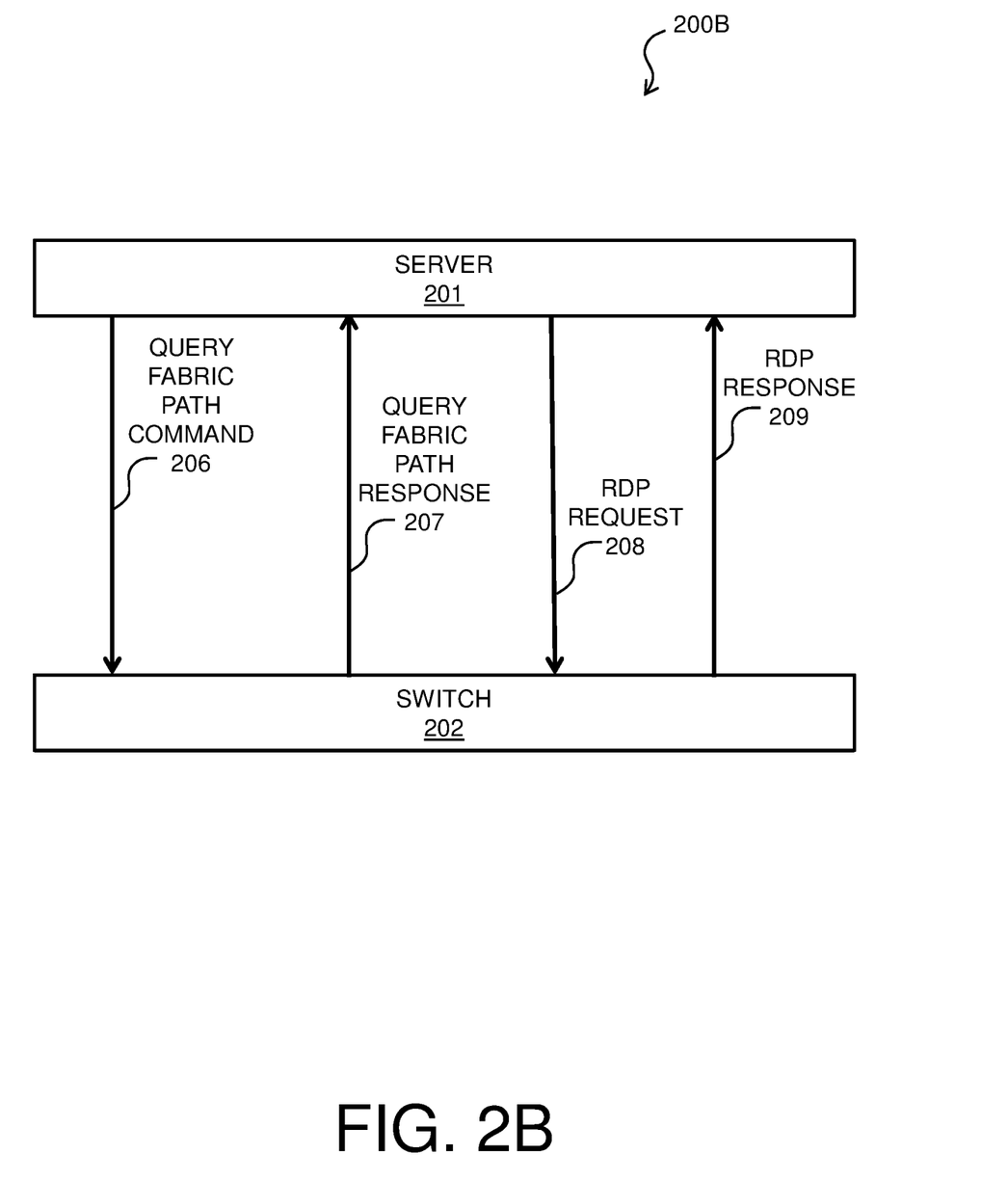
Figure 2C:
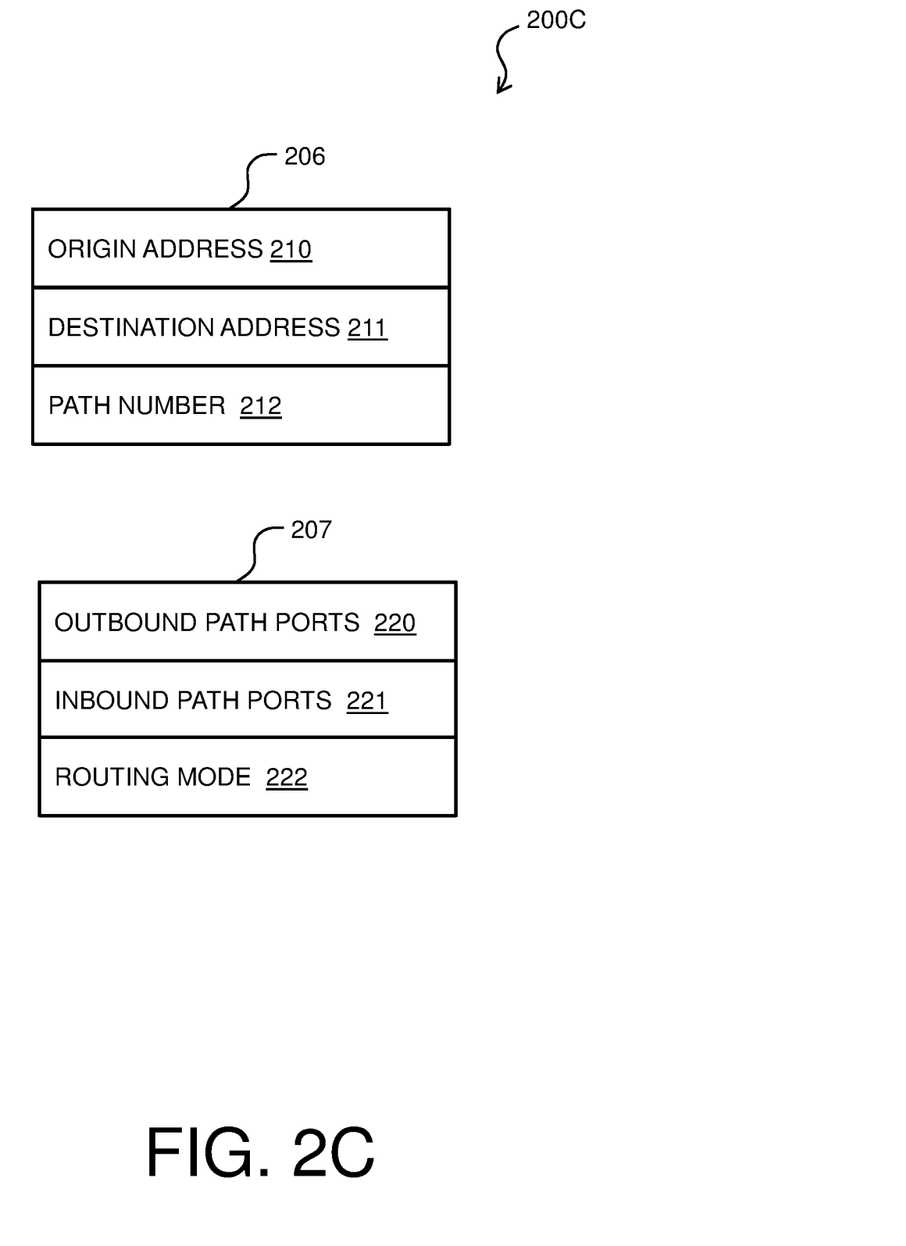

FIGS. 2A-C are block diagrams of a system 200A-C that includes ISL identification and monitoring in accordance with one or more embodiments of the present invention. System 200A of FIG. 2A includes a server 201 that is in communication with a disk 205 via a SAN fabric that includes switch 202, ISLs 203A-E, and switch 204. Any of server 201, disk 205, and switches 202 and 204 may include any of the elements discussed above with respect to computer system 100 of FIG. 1. Server 201 and disk 205 are endpoints of the SAN fabric that includes switch 202, switch 204 and ISLs 203A-E. Server 201 is directly connected to port 240 (e.g., an N_Port) on switch 202, and disk 205 is directly connected to port 241 (e.g., an N_Port) on switch 204. Each of ISLs 203A-E are connected to a respective port (e.g., an E_Port) of ports 230A-E and ports 231A-E on each of switch 202 and switch 204. ISL 203A is located between ports 230A and 231A; ISL 203B is located between ports 230B and 231B; ISL 203C is located between ports 230C and 231C; ISL 203D is located between ports 230D and 231D; and ISL 203E is located between ports 230E and 231E. ISLs 203A-E may each include any appropriate number of intermediate switches (including additional ports) and links in various embodiments. The multiple ISLs 203A-E may provide capacity and redundancy for the connection between switches 202 and 204.

Various embodiments of system 200A may implement a static routing mode or a dynamic routing mode between server 201 and disk 205. In the static routing mode, the switches 202 and 204 may use a defined ISL for each direction of traffic between two endpoints. For example, for outbound traffic from server 201 to disk 205, the switch 202 may use ISL 203B, and for inbound traffic from disk 205 to server 201, switch 204 may use ISL 203D. In the dynamic routing mode, any of the ISLs 203A-E may be used for traffic in any direction between the server 201 and disk 205. Any switches, such as switches 202 and 204 in the SAN fabric of system 200A, may include a routing table that specifies the routing modes and ISLs for the various connections between endpoints of the SAN fabric; a SAN fabric may include any appropriate number of endpoints.

Failures may occur in any of ISLs 203A-E. For example, in the static routing mode described above between server 201 and disk 205, ISL 203B may exhibit problems before a failure occurs in the ISL 203B. Identification of a potential future failure may allow remedial measures to be taken before the failure occurs (e.g., in static routing mode, selecting a different ISL, e.g., ISL 203C, for outbound traffic between server 201 and disk 205, and updating the routing tables based on the selected ISL). A failure in ISL 203B may impact frames sent from the server 201 to the disk 205, as well frames sent between any other endpoints that use ISL 203B. In dynamic routing mode, a failure in a single ISL such as ISL 203B may impact traffic on other ISLs such as ISL 203A, 203C, and 203D.

System 200B of FIG. 2B shows an exchange of messages that are passed between the server 201 and the switch 202 in system 200A in accordance with one or more embodiments of ISL identification and monitoring. The server 201 sends a query fabric path command 206 to the switch 202 to request information regarding the specific ISLs (e.g., of ISLs 203A-E) that are used to transport data (e.g., frames or packets) of a source port and destination port pair between the server 201 and the disk 205. The switch 202 responds to the query fabric path command 206 with a query fabric path response 207. The query fabric path response 207 may list ports that are included in the ISLs that are used in the connection between the server 201 and the disk 205. The server 201 may then monitor the ports that were listed in the query fabric path response 207 by periodically sending a plurality of RDP requests, such as RDP request 208, to any ports that were listed in the query fabric path response 207. The ports each return an RDP response such as RDP response 209 to the server 201 in response to the RDP requests such as RDP request 208. An RDP response 209 may include any appropriate data regarding the port that sent the RDP response 209, such as voltage, current, and temperature information. The RDP requests may be sent by the server 201 periodically, and the health of the various ports may be monitored based on the resulting RDP responses during operation of the SAN fabric of system 200A.

If it is determined that a port is exhibiting signs of failure based on the RDP responses 209 that were sent by the port to the monitoring endpoint, an ISL (e.g., ISL 203B) associated with the failing port may be preemptively taken offline before the failure occurs. In some embodiments, a monitoring endpoint (e.g., server 201) may issue control unit port (CUP) commands to decommission an ISL associated with a failing port, and may also notify the SAN administrator of the failing port. While in system 200B of FIG. 2B, the server 201 is shown as sending the query fabric path command 206 to switch 202, in some embodiments, any endpoint in a SAN fabric (e.g., server 201 or disk 205) may send a query fabric path command 206 to a directly connected switch (e.g., switch 202 or 204), and may periodically send RDP requests 208 to any ports listed in a received query fabric path response 207.

System 200C of FIG. 2C shows a query fabric path command 206 and a query fabric path response 207 in accordance with one or more embodiments of ISL identification and monitoring. The query fabric path command 206 includes an origin endpoint address 210 (e.g., in an embodiment in which the server 201 is sending the query fabric path command 206, the identifier of a connection to server 201), a destination endpoint address 211 (e.g., in an embodiment in which the server 201 is sending the query fabric path command 206, the identifier of a connection to disk 205), and a path number 212. The path number 212 may correspond to the ISL(s) that make up the Nth shortest path between the origin endpoint and destination endpoint that the origin endpoint wishes to monitor. The Nth shortest path may be determined by any appropriate algorithm, such as a fabric shortest path first (FSPF) routing protocol. N may be any appropriate number in various embodiments, and may be configured by an administrator of the origin endpoint in some embodiments. A query fabric path command such as query fabric path command 206 may be sent to a switch, such as switch 202 or switch 204, by any endpoint (e.g., server 201 or disk 205) in a SAN fabric such as is illustrated by system 200A; the sending endpoint of the query fabric path command 206 is the origin endpoint.

The query fabric path response 207 includes a list of outbound path ports 220, a list of inbound path ports 221, and a routing mode 222. The list of outbound path ports 220 includes port identifiers for any switch ports (e.g., E_Ports) included in the outbound data path from the origin endpoint (e.g., server 201) to the destination endpoint (e.g., disk 205). The list of inbound ports includes port identifiers for any switch ports (e.g., E_Ports) included in the inbound data path from the destination endpoint (e.g., disk 205) to the origin endpoint (e.g., server 201). The routing mode 222 indicates whether the routing between the origin endpoint and the destination endpoint is static or dynamic. If the routing mode 222 is static, the ports listed in outbound path ports 220 and inbound path ports 221 correspond to the static paths that are used (e.g., ISL 203B for outbound path ports, and ISL 203D for inbound path ports). If the routing mode 222 is dynamic, the ports listed in outbound path ports 220 and inbound path ports 221 correspond to the members of the Nth shortest path (which may be determined by FSPF or any other appropriate algorithm) between the origin endpoint and destination endpoint, as specified by the path number 212 in query fabric path command 206. A query fabric path response such as query fabric path response 207 may be sent from a switch, such as switch 202 or switch 204, to any endpoint (e.g., server 201 or disk 205) in a SAN fabric such as is illustrated by system 200A in response to a query fabric path command 206. In some embodiments, the query fabric path response 207 may also include an indication of whether there is any link aggregation in use between the origin and destination endpoints, and if there is link aggregation, which link is the master and which link(s) are members (e.g., of ISLs 203A-E).

Any endpoint (e.g., a server or a disk) in a SAN fabric, such as is shown in system 200A of FIG. 2A, may send a query fabric path command 206 to a directly connected switch. In some embodiments of a system 200A including a SAN fabric, each endpoint in the SAN fabric may monitor the path between itself and all other endpoints that communicate with the endpoint. In such embodiments, each endpoint may send a query fabric path command 206 for each other endpoint that is in communication with the endpoint. Each endpoint may then periodically send RDP requests 208 to all ports listed in any query fabric path responses 207 that are received by the endpoint. The ports may be monitored for signs of failure by the origin endpoint based on RDP responses 209 that are received in response to the RDP requests 208. In some embodiments of a system 200A including a SAN fabric, a single endpoint that is in communication with a plurality of other endpoints may be designated to perform port monitoring for each of the plurality of connections between the single endpoint and the plurality of other endpoints (e.g., a server that is in communication with a plurality of disks may monitor the ports that are included in the paths between itself and each of the plurality of disks). Any endpoint in a SAN fabric may perform port monitoring, including sending RDP requests and receiving RDP responses, based on query fabric path commands and responses.

In an example SAN fabric corresponding to systems 200A-C of FIGS. 2A-C that implements link aggregation, the routing tables in the switches 202 and 204 may specify that, for traffic from server 201 to disk 205, a group including ISLs 203A and 203B are used, with ISL 203A being a master link, and, for traffic from disk 205 to server 201, a group including ISLs 203C, 203D, and 203E are used, with ISL 203C being a master link. For a query fabric path command 206 sent by server 201 to switch 202 regarding the path(s) to and from disk 205, the path number 212 may be 1. In the query fabric path response 207, the list of outbound path ports 220 may include port identifiers for ports 230A and 231A as master, and also ports 230B and 231B. The list of inbound path ports 221 may include port identifiers for ports 230C and 231C as master, and also ports 230D, 231D, 230E, and 231E. The routing mode 222 may be static. The server 201 may send periodic RDP requests 208 to ports 230A-E and 231A-E based on the query fabric path response 207 in order to monitor for any failures in ISLs 203A-E.

It is to be understood that the block diagrams of FIG. 2A-C are not intended to indicate that the systems 200A-C are to include all of the components shown in FIGS. 2A-C. Rather, the systems 200A-C can include any appropriate fewer or additional components not illustrated in FIG. 2A-C (e.g., additional servers, disks, switches, ISLs, commands, requests, responses, command fields, request fields, response fields, etc.). Further, the various servers and disks may be interconnected in any appropriate manner by any appropriate number of switches and ISLs. Further, the embodiments described herein with respect to systems 200A-C may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
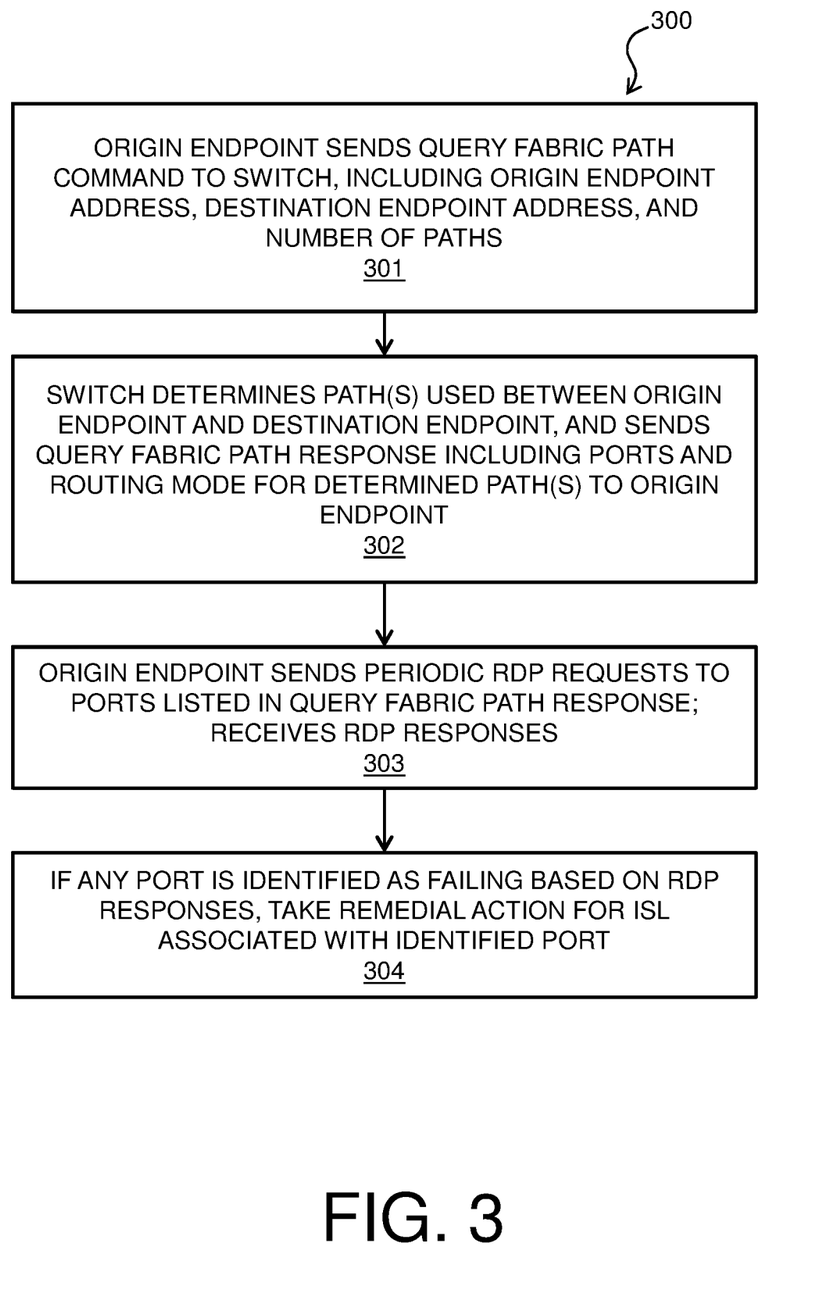
FIG. 3 is a process flow diagram of a method for ISL identification and monitoring in accordance with one or more embodiments of the present invention.

FIG. 3 is a process flow diagram of a method 300 for ISL identification and monitoring in accordance with one or more embodiments of the present invention. Some embodiments of method 300 of FIG. 3 may be implemented in systems 200A-C that are shown in FIGS. 2A-C. In block 301, an origin endpoint (such as server 201 and/or disk 205) of FIGS. 2A-B, in a SAN fabric sends a query fabric path command 206 to a switch (such as switch 202 and/or switch 204) for a particular destination endpoint (such as disk 205 and/or server 201). The query fabric path command 206 includes an origin endpoint address 210, a destination endpoint address 211, and a path number 212 (e.g., Nth shortest path) that the origin endpoint wishes to monitor. The path number 212 may be any appropriate number, and may be set by an administrator of the origin endpoint in some embodiments.

In block 302, the switch sends a query fabric path response 207 to the origin endpoint in response to the query fabric path command 206 of block 301. The query fabric path response 207 includes a list of outbound path ports 220, a list of inbound path ports 221, and a routing mode 222. The routing mode 222 may be either static or dynamic in some embodiments. The port identifiers included in the list of outbound path ports 220 and list of inbound path ports 221 may be determined based on the path number 212. For example, for a dynamic routing mode connection between the origin endpoint and destination endpoint, there may be a plurality of ISLs in use. In an embodiment in which the path number 212 is two, only port identifiers for ports that are included in the second shortest path (as determined by FSPF or any other appropriate algorithm) between the origin endpoint and the destination endpoint may be included in the list of outbound path ports 220 and list of inbound path ports 221 in query fabric path response 207. In some embodiments, the query fabric path response 207 that is sent in block 302 may include an indication of whether there is any link aggregation in use between the origin and destination endpoints, and if there is link aggregation, which ISL is the master and which ISL(s) are members.

In block 303, the origin endpoint sends periodic RDP requests 208 to each of the ports listed in both the list of outbound path ports 220 and the list of inbound path ports 221 in the query fabric path response 207. RDP responses 209 are received in block 303 in response to each of the RDP requests 208. An RDP response 209 may include any appropriate information regarding the sending port, including but not limited to voltage, current, and temperature information. In block 304, based on the RDP responses 209 that are received in response to the periodic RDP requests 208, the origin endpoint may identify a failing port, and may perform remedial action, such as taking an ISL (e.g., any of ISLs 203A-E) that is associated with the failing port offline before failure occurs. The origin endpoint may notify the switch that includes the failing port that was identified in block 304. In some embodiments, the origin endpoint may issue control unit protocol (CUP) commands to decommission an ISL associated with a failing port, and may also notify the SAN administrator of the failing port in block 304. Routing tables in the switches of the SAN fabric may be updated based on the remedial action of block 304.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system comprising a processor and a memory configured to:
send a query fabric path command from an origin endpoint to a first switch, the query fabric path command including an origin address corresponding to the origin endpoint and a destination address corresponding to a destination endpoint;
receive a query fabric path response from the first switch based on the query fabric path command, the query fabric path response including a plurality of port identifiers, wherein the plurality of port identifiers correspond to a plurality of expansion ports (E_Ports) of a plurality of inter-switch links (ISLs) between the first switch and a second switch, and wherein each of the plurality of ISLs is configured to transmit traffic between the origin endpoint and the destination endpoint; and
monitor the plurality of E_Ports, wherein the monitoring of the plurality of E_Ports comprises:
sending a respective read diagnostic parameters (RDP) request from the origin address to each of the plurality of E_Ports;
receiving an RDP response from each E_port of the plurality of E_Ports at the origin address, wherein each RDP response includes at least one of voltage data, current data, and temperature data corresponding to the port that sent the RDP response; and
identifying a failing port of the plurality of E_Ports based on at least one of the voltage data, current data, and temperature data included in an RDP response from the failing port.

2. The system of claim 1, wherein the query fabric path response includes a routing mode for a connection between the origin address and the destination address, the routing mode comprising one of static routing and dynamic routing.

3. The system of claim 1, wherein the plurality of port identifiers comprises a plurality of outbound path ports used for traffic from the origin address to the destination address, and a plurality of inbound path ports used for traffic from the destination address to the origin address.

4. The system of claim 3, wherein the plurality of outbound path ports includes a designation of an outbound master link, and the plurality of inbound path ports includes a designation of an inbound master link.

5. The system of claim 1, wherein the query fabric path command includes a path number, and wherein the plurality of port identifiers in the query fabric path response correspond to the path number based on a fabric shortest path first (FSPF) protocol.

6. The system of claim 1, wherein the processor is further configured to:
preemptively take ISL associated with the failing port offline based on identifying the failing port before a failure occurs in the failing port.

7. A computer-implemented method, comprising:
sending, by a processor, a query fabric path command from an origin endpoint to a first switch, the query fabric path command including an origin address corresponding to the origin endpoint and a destination address corresponding to a destination endpoint;
receiving, by the processor, a query fabric path response from the first switch based on the query fabric path command, the query fabric path response including a plurality of port identifiers, wherein the plurality of port identifiers correspond to a plurality of expansion ports (E_Ports) of a plurality of inter-switch links (ISLs) between the first switch and a second switch, and wherein each of the plurality of ISLs is configured to transmit traffic between the origin endpoint and the destination endpoint; and
monitoring, by the processor, the plurality of E_Ports, wherein the monitoring of the plurality of ports comprises:
sending a respective read diagnostic parameters (RDP) request from the origin address to each of the plurality of ports;
receiving an RDP response from each port of the plurality of ports at the origin address, wherein each RDP response includes at least one of voltage data, current data, and temperature data corresponding to the port that sent the RDP response; and
identifying a failing port of the plurality of ports based on at least one of the voltage data, current data, and temperature data included in an RDP response from the failing port.

8. The computer-implemented method of claim 7, wherein the query fabric path response includes a routing mode for a connection between the origin address and the destination address, the routing mode comprising one of static routing and dynamic routing.

9. The computer-implemented method of claim 7, wherein the plurality of port identifiers comprises a plurality of outbound path ports used for traffic from the origin address to the destination address, and a plurality of inbound path ports used for traffic from the destination address to the origin address.

10. The computer-implemented method of claim 9, wherein the plurality of outbound path ports includes a designation of an outbound master link, and the plurality of inbound path ports includes a designation of an inbound master link.

11. The computer-implemented method of claim 7, wherein the query fabric path command includes a path number, and wherein the plurality of port identifiers in the query fabric path response correspond to the path number based on a fabric shortest path first (FSPF) protocol.

12. The computer-implemented method of claim 7, the method comprising:
preemptively taking an ISL associated with the failing port offline based on identifying the failing port before a failure occurs in the failing port.

13. A computer program product comprising:
a computer readable storage medium having program instructions embodied therewith, the program instructions executable by a processing device to cause the processing device to perform a method comprising:
sending a query fabric path command from an origin endpoint to a first switch, the query fabric path command including an origin address corresponding to the origin endpoint and a destination address corresponding to a destination endpoint;
receiving a query fabric path response from the first switch based on the query fabric path command, the query fabric path response including a plurality of port identifiers, wherein the plurality of port identifiers correspond to a plurality of expansion ports (E_Ports) of a plurality of inter-switch links (ISLs) between the first switch and a second switch, and wherein each of the plurality of ISLs is configured to transmit traffic between the origin endpoint and the destination endpoint; and
monitoring the plurality of E_Ports, wherein the monitoring of the plurality of ports comprises:
sending a respective read diagnostic parameters (RDP) request from the origin address to each of the plurality of ports;

receiving an RDP response from each port of the plurality of ports at the origin address, wherein each RDP response includes at least one of voltage data, current data, and temperature data corresponding to the port that sent the RDP response; and identifying a failing port of the plurality of ports based on at least one of the voltage data, current data, and temperature data included in an RDP response from the failing port.

14. The computer program product of claim 13, wherein the query fabric path response includes a routing mode for a connection between the origin address and the destination address, the routing mode comprising one of static routing and dynamic routing.

15. The computer program product of claim 13, wherein the plurality of port identifiers comprises a plurality of outbound path ports used for traffic from the origin address to the destination address, and a plurality of inbound path ports used for traffic from the destination address to the origin address.

16. The computer program product of claim 15, wherein the plurality of outbound path ports includes a designation of an outbound master link, and the plurality of inbound path ports includes a designation of an inbound master link.

17. The computer program product of claim 13, wherein the query fabric path command includes a path number, and wherein the plurality of port identifiers in the query fabric path response correspond to the path number based on a fabric shortest path first (FSPF) protocol.

* * * * *